US007593241B2

(12) United States Patent
Kwon et al.

(10) Patent No.: US 7,593,241 B2
(45) Date of Patent: Sep. 22, 2009

(54) HYBRID POWER SUPPLY SYSTEM

(76) Inventors: Oh-Young Kwon, 302-1603, Sungwon Apt., Sangnam-dong Changwon-si, Kyungsangnam-do, 641-010 (KR); Alexandre Golovtchanski, 213-504, Hyundai Apt., Banlim-dong Changwon-si, Kyungsangnam-do, 641-180 (KR)

( * ) Notice: Subject to any disclaimer, the term of this patent is extended or adjusted under 35 U.S.C. 154(b) by 660 days.

(21) Appl. No.: 10/577,171

(22) PCT Filed: Jun. 17, 2005

(86) PCT No.: PCT/KR2005/001881

§ 371 (c)(1), (2), (4) Date: Apr. 26, 2006

(87) PCT Pub. No.: WO2006/083064

PCT Pub. Date: Aug. 10, 2006

(65) Prior Publication Data

US 2008/0272706 A1 Nov. 6, 2008

(30) Foreign Application Priority Data

Feb. 2, 2005 (KR) ...................... 10-2005-0009343

(51) Int. Cl.
*H02M 3/335* (2006.01)
*H05B 41/16* (2006.01)

(52) U.S. Cl. ............................ 363/16; 363/17; 363/15; 363/56.02; 363/21.12; 315/247; 315/274; 315/291; 315/312

(58) Field of Classification Search ............. 363/13–20, 363/22–55, 57–99, 21; 315/247, 246, 224, 315/225, 209 R, 307–326, 274–298
See application file for complete search history.

(56) References Cited

U.S. PATENT DOCUMENTS

| | | | | |
|---|---|---|---|---|
| 5,969,954 | A | 10/1999 | Zaitsu | |
| 6,028,398 | A | 2/2000 | Kawasaki et al. | |
| 6,600,273 | B2 | 7/2003 | Kim et al. | |
| 6,703,796 | B2 | 3/2004 | Che-Chen et al. | |
| 7,466,565 | B2 * | 12/2008 | Tanaka ........................ | 363/16 |

* cited by examiner

*Primary Examiner*—Tuyet Vo
(74) *Attorney, Agent, or Firm*—Ladas & Parry LLP

(57) ABSTRACT

A hybrid power supply system including piezoelectric and ferrite transformers for driving a discharge lamp is provided. Specifically, the hybrid power supply system includes a rectifier/filter, a piezoelectric inverter, and a ferrite converter. The rectifier/filter has an input terminal connected to an external AC voltage to convert the external AC voltage to a DC voltage. The piezoelectric inverter is connected to the rectifier/filter to step up and convert the DC voltage to an AC voltage for driving the discharge lamp. The ferrite transformer is connected to the rectifier/filter to step down the DC voltage to a rated DC voltage for driving discharge lamp circuits other than the discharge lamp. The piezoelectric inverter and the ferrite converter are integrated by connecting a primary side of the piezoelectric step-up transformer and a primary side of the ferrite step-down transformer in series or in parallel with an output terminal of switching circuits.

9 Claims, 8 Drawing Sheets

HYBRID POWER SUPPLY SYSTEM

TECHNICAL FIELD

The present invention relates to a power supply system, and more particularly to a hybrid power supply system including a ferrite transformer and a piezoelectric transformer suitable for a variety of input/output voltages, wherein a converter circuit having an inverter and a rectifier and filter circuit are integrated to decrease the size of the power supply system and increase the power efficiency thereof.

BACKGROUND ART

Household power generally has a voltage of 85-264$V_{AC}$. A Cold Cathode Fluorescent Lamp (CCFL), which is used as a discharge lamp for a backlight of a general LCD monitor, requires a voltage much higher than the household voltage. On the other hand, all display circuits of the general LCD monitor such as a video control circuit, other than the CCFL, use a DC voltage lower than the household voltage. For example, multi-lamp LCD monitors require a rated voltage of 12-15$V_{DC}$, whereas CCFLs require a voltage higher than about 1,000$V_{AC}$ for lighting and a voltage of 500-700$V_{AC}$ for discharging.

To meet these requirements, as shown in FIG. 1, the conventional power supply system allows an AC input from a socket to pass through a rectifier/filter 1, a fly-back converter 2, a DC-AC inverter 3, and a buck regulator 4, so that AC power is supplied to CCFLs and DC power is supplied to display circuits. The conventional power supply system performs conversion between AC and DC at too many stages, thereby causing inconvenience and inefficiency. Specifically, the rectifier/filter 1 and the fly-back converter 2 are integrated into an additional adapter, which is connected to the DC-AC inverter 3 and the buck regulator 4 through an additional connector (not shown) and an additional cable (not shown). This reduces the power efficiency of the conventional system to about 70% and increases the manufacturing costs and size thereof. In addition, a conventional ferrite step-down transformer (not shown) used in the DC-AC inverter 3 is not only combustible but also causes Electromagnetic Interference (EMI) noise.

A piezoelectric transformer has been developed to overcome these problems. The piezoelectric transformer has a variety of advantages such as a high power efficiency of about 98%, low EMI noise, incombustibility, and simple CCFL operation control. The piezoelectric transformer is a vibrator that includes a piezoelectric body and two pairs of input and output electrodes formed on the surfaces of the piezoelectric body and that converts an electrical input signal to a mechanical signal, thereby mechanically transferring electrical energy. The input and output electrodes are arranged to provide impedance transformation, thereby achieving voltage transformation. The output voltage of the piezoelectric transformer depends on its operating frequency and load impedance. All CCFL operations including ignition (with a very high impedance load) and preset current control can be simply controlled by changing the switching frequency near the resonance frequency with a maximum load.

FIGS. 2-4 illustrate the schematic structure of general piezoelectric transformers.

FIG. 2 illustrates the schematic structure of a Rosen type piezoelectric transformer that is widely used for CCFL backlighting. A piezoelectric body of this piezoelectric transformer is in the form of a flat ceramic substrate which is wider than it is thick and is longer than it is wide. A pair of electrodes spaced apart in the thickness direction is formed on the piezoelectric body to cause polarization in the thickness direction. An electrode is also formed on a longitudinal end of the piezoelectric body to cause polarization in the longitudinal direction. When an input voltage $V_{in}$ having a resonance frequency defined by the length of the piezoelectric body is applied to an input of the piezoelectric body, electrostriction causes strong mechanical vibrations of the piezoelectric body in the longitudinal direction, so that charges are produced on an oscillating portion $V_{out}$ of the piezoelectric body due to piezoelectricity, thereby generating a high voltage output. Due to its high output impedance, the Rosen type piezoelectric transformer is suitable for igniting and lighting CCFLs. However, the Rosen type piezoelectric transformer has a low power transmission capacity, and its known maximum power is only 10 W.

FIG. 3 illustrates the schematic structure of a longitudinal vibration mode piezoelectric transformer that vibrates in the thickness direction.

This piezoelectric transformer includes a low impedance vibrating portion (input) including a plurality of piezoelectric layers and a high impedance vibrating portion (output) including a piezoelectric layer. The piezoelectric layers are laminated together, which cause vibrations in the longitudinal or thickness direction. The piezoelectric layers may be mechanically stressed when they are laminated together. This piezoelectric transformer is referred to as a "Transoner", which has a high power transmission capacity, and its known maximum power is about 80 W. Although the longitudinal vibration mode piezoelectric transformer is efficiently used for step-up and step-down transformation, its output voltage is not high enough to drive CCFLs. Although the longitudinal vibration mode piezoelectric transformer can be used for a step-down AC-DC adapter (see U.S. Pat. No. 5,969,954), it is disadvantageous to ferrite converters since it still faces challenges in rectifying and smoothing the AC output voltage.

FIG. 4 illustrates the schematic structure of a ring-dot type piezoelectric transformer.

This piezoelectric transformer includes an input portion (specifically, a ring electrode) and an output portion (specifically, a dot electrode) that have the same polarization direction. This piezoelectric transformer is referred to as a "unipoled ring-dot type piezoelectric transformer". The ring-dot type piezoelectric transformer is easier to manufacture than the Rosen type piezoelectric transformer of FIG. 2 and is advantageous in terms of power density. The ring-dot type piezoelectric transformer is also advantageous over the longitudinal vibration mode piezoelectric transformer of FIG. 3 in that it has a good impedance matching with CCFLs. In the ring-dot type piezoelectric transformer, an input voltage $V_{in}$ applied across input electrodes on a vibrating portion having a low impedance is stepped up to a high output voltage $V_{out}$ between output electrodes on an oscillating portion having a high impedance.

As is described above, the conventional power supply systems have low power efficiency and entail high manufacturing costs and are also large in size. To overcome these problems, studies have been made on a technology for removing the additional adapter, which is a major cause of the problems, to reduce the size of the power supply system and increase the power efficiency thereof.

One example is a technology for a CCFL power supply system (see U.S. Pat. No. 6,703,796) in which a DC-DC converter for stepping down the circuit drive voltage and a DC-AC inverter for stepping up the lamp drive voltage are integrated with a rectifier/filter circuit without an additional AC-DC adapter, thereby achieving a highly efficient power supply for LCD monitors. Especially, integrating the DC-AC inverter with the ferrite DC-DC converter in the power supply system is advantageous in terms of the efficiency, EMI noise, and size.

DISCLOSURE

[Technical Problem]

Therefore, the present invention has been made in view of the above problems, and it is an object of the present invention to provide a highly efficient power supply with low EMI noise and high power efficiency.

This object is accomplished by providing a hybrid power supply system as set forth in the claims.

[Technical Solution]

In accordance with the present invention, the object can be accomplished by the provision of a hybrid power supply system including a ferrite transformer and a piezoelectric transformer suitable for a variety of input and output voltages, wherein a piezoelectric DC-AC inverter circuit, a ferrite DC-DC converter circuit, and an input AC-DC converter circuit are integrated. In addition, an input portion of the piezoelectric transformer, an input portion of the ferrite transformer, and an output portion of the DC-AC converter circuit are integrated.

[Advantageous Effects]

The power efficiency of the hybrid power supply system according to the present invention is 91%, which is about 21% higher than the conventional power supply system. Since the input portion of the piezoelectric transformer, the input portion of the ferrite transformer, and the output portion of the DC-AC converter circuit are integrated, the hybrid power supply system is reduced in size, thereby increasing its power supply efficiency. In addition, since it uses a piezoelectric step-up transformer, the hybrid power supply system significantly reduces EMI noise, compared to the conventional power supply systems.

That is, the hybrid power supply system according to the present invention has much lower EMI noise and much higher power efficiency than the conventional power supply systems.

BEST MODE

A hybrid power supply system according to the present invention includes a rectifier/filter having an input terminal connected to an external AC voltage, the rectifier/filter converting the external AC voltage to a DC voltage; a piezoelectric inverter connected to the rectifier/filter, the piezoelectric inverter stepping up and converting the DC voltage to an AC voltage for driving a discharge lamp; and a ferrite converter connected to the rectifier/filter, the ferrite converter stepping down the DC voltage to a rated DC voltage for driving discharge lamp circuits other than the discharge lamp.

The piezoelectric inverter includes two first switching circuits having respective input terminals and a common output terminal; a driver circuit electrically coupled to respective control input terminals of the first switching circuits, the driver circuit driving the first switching circuits; at least one piezoelectric step-up transformer having a primary side electrically coupled to the common output terminal of the first switching circuits and a secondary side electrically coupled to the discharge lamp; a sampling circuit electrically coupled to the discharge lamp, the sampling circuit detecting a current value of the discharge lamp and outputting a feedback signal; a comparator circuit electrically coupled to the sampling circuit and a frequency control circuit, the comparator circuit comparing the feedback signal with a predetermined reference signal; and the frequency control circuit electrically coupled to the comparator circuit and the driver circuit, the frequency control circuit controlling a switching frequency for the switching circuits according to an output signal of the comparator circuit.

The ferrite converter includes a ferrite step-down transformer and a rectifier circuit. The ferrite step-down transformer has a primary side electrically coupled to the output terminal of the switching circuits and a secondary side electrically coupled to the rectifier circuit. The rectifier circuit is electrically coupled to the secondary side of the ferrite step-down transformer.

Figure 1:
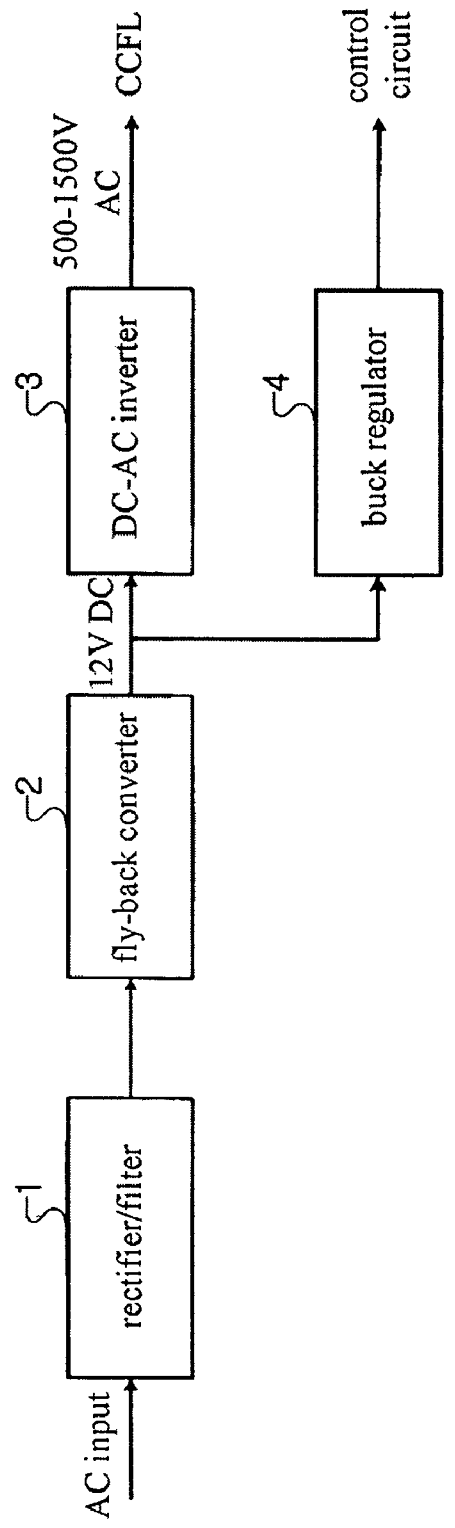
FIG. 1 is a schematic block diagram of a conventional power supply system.
Figure 2:
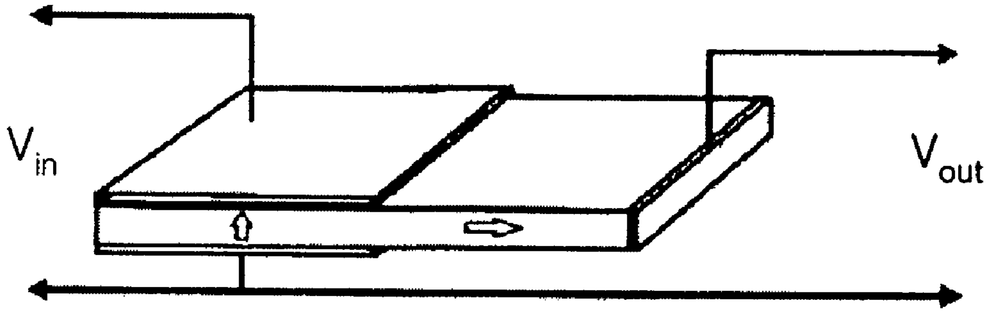
FIG. 2 schematically illustrates a general Rosen type piezoelectric transformer.
Figure 3:
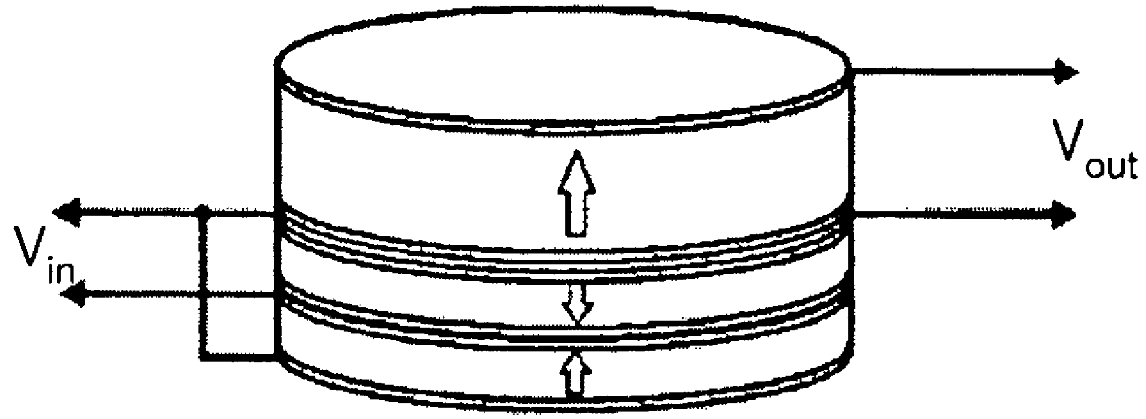
FIG. 3 schematically illustrates a general longitudinal vibration mode piezoelectric transformer.
Figure 4:
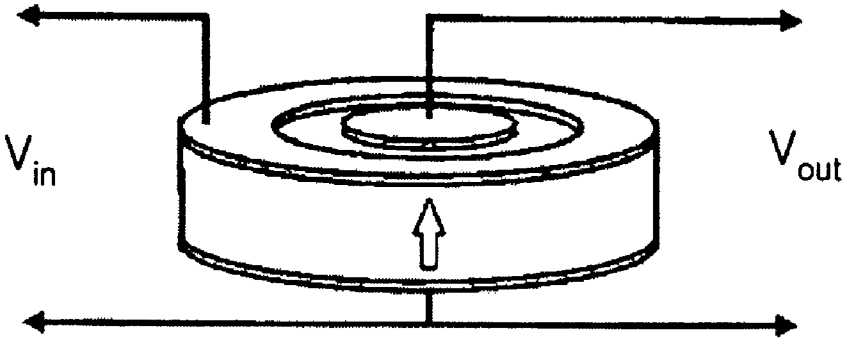
FIG. 4 schematically illustrates a general ring-dot type piezoelectric transformer.
Figure 5:
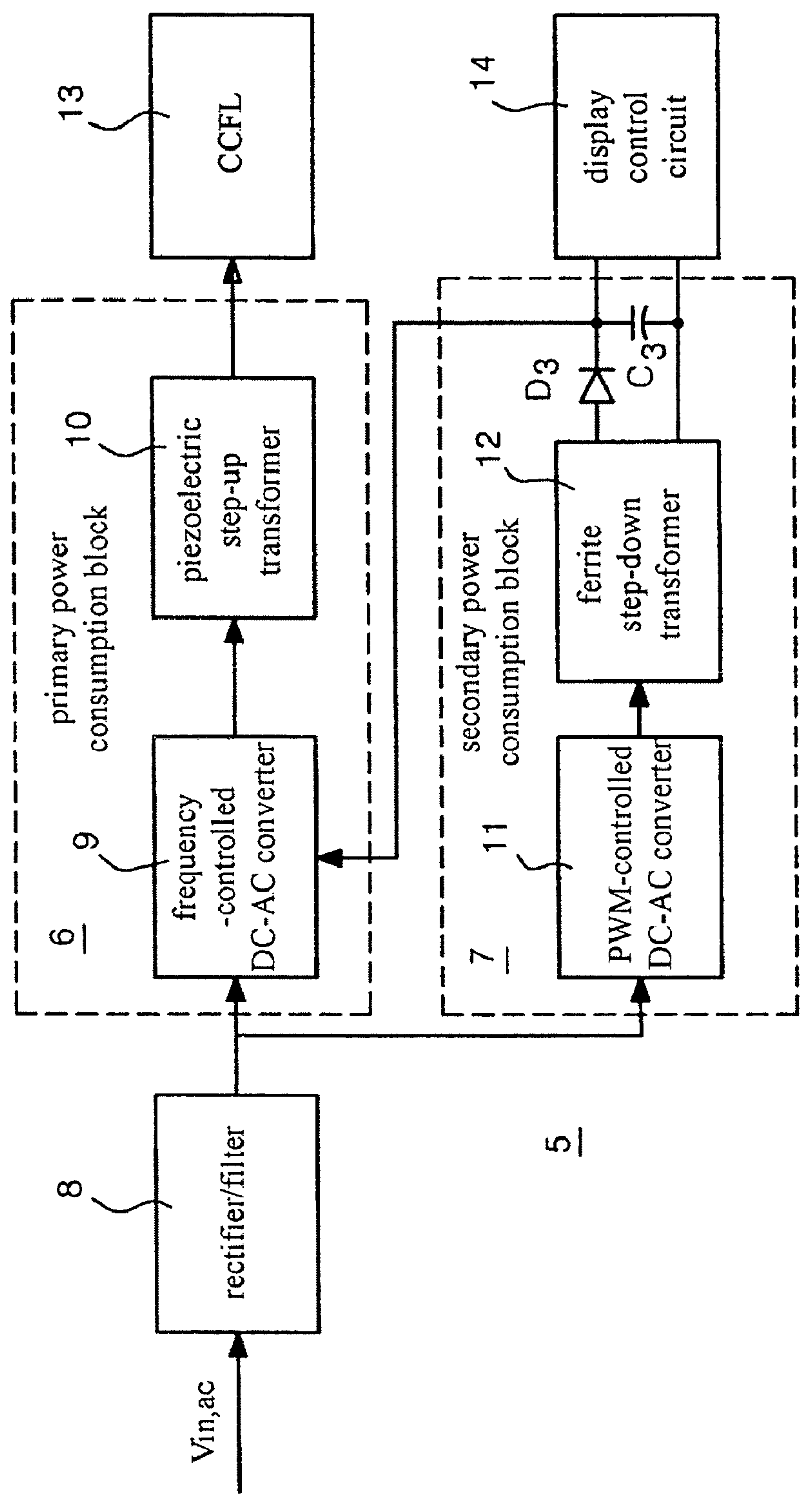
FIG. 5 is a schematic block diagram of a hybrid power supply system according to the present invention.

FIG. 5 is a schematic block diagram of a hybrid power supply system according to the present invention.

The hybrid power supply system 5 according to the present invention includes a rectifier/filter 8, a primary power consumption block 6, and a secondary power consumption block 7. The rectifier/filter 8 is connected to an external AC power source to convert an input AC voltage to a DC voltage. The primary power consumption block 6 is connected to the rectifier/filter 8 to convert the DC voltage to a stepped-up AC voltage and then to supply the AC voltage to a lamp such as a CCFL 13. The secondary power consumption block 7 is connected to the rectifier/filter 8 to step down the DC voltage to a rated DC voltage and then to supply the rated DC voltage to system circuits other than the CCFL 13.

Specifically, the rectifier/filter 8 has an input terminal connected to the external AC power source and converts an input AC voltage (generally, a household AC voltage in the range of 90-132$V_{AC}$ or 180-264$V_{AC}$) to a DC voltage (specifically, a voltage in the range of 120-190$V_{DC}$ or 250-380$V_{DC}$).

The primary power consumption block 6 is connected to the CCFL 13 and includes a frequency-controlled DC-AC converter 9 and a piezoelectric step-up transformer 10. The frequency-controlled DC-AC converter 9 converts the DC voltage output from the rectifier/filter 8 back to an AC voltage and provides the AC voltage to the piezoelectric step-up transformer 10. The piezoelectric step-up transformer 10 steps up the AC voltage to a high AC voltage and provides the high AC voltage to the CCFL 13.

The secondary power consumption block 7 is connected to the frequency-controlled DC-AC converter 9 and a display control circuit 14. The secondary power consumption block 7 includes a fly-back converter that includes a Pulse Width Modulation (PWM)-controlled DC-AC converter circuit 11, a ferrite step-down transformer 12, and a rectifier circuit $D_3$ and $C_3$. The AC voltage stepped down by the ferrite step-down transformer 12 is converted to a DC voltage through the rectifier circuit $D_3$ and $C_3$ and the DC voltage is then provided to the display control circuit 14.

[Mode for Invention]

Embodiment 1

Figure 6:
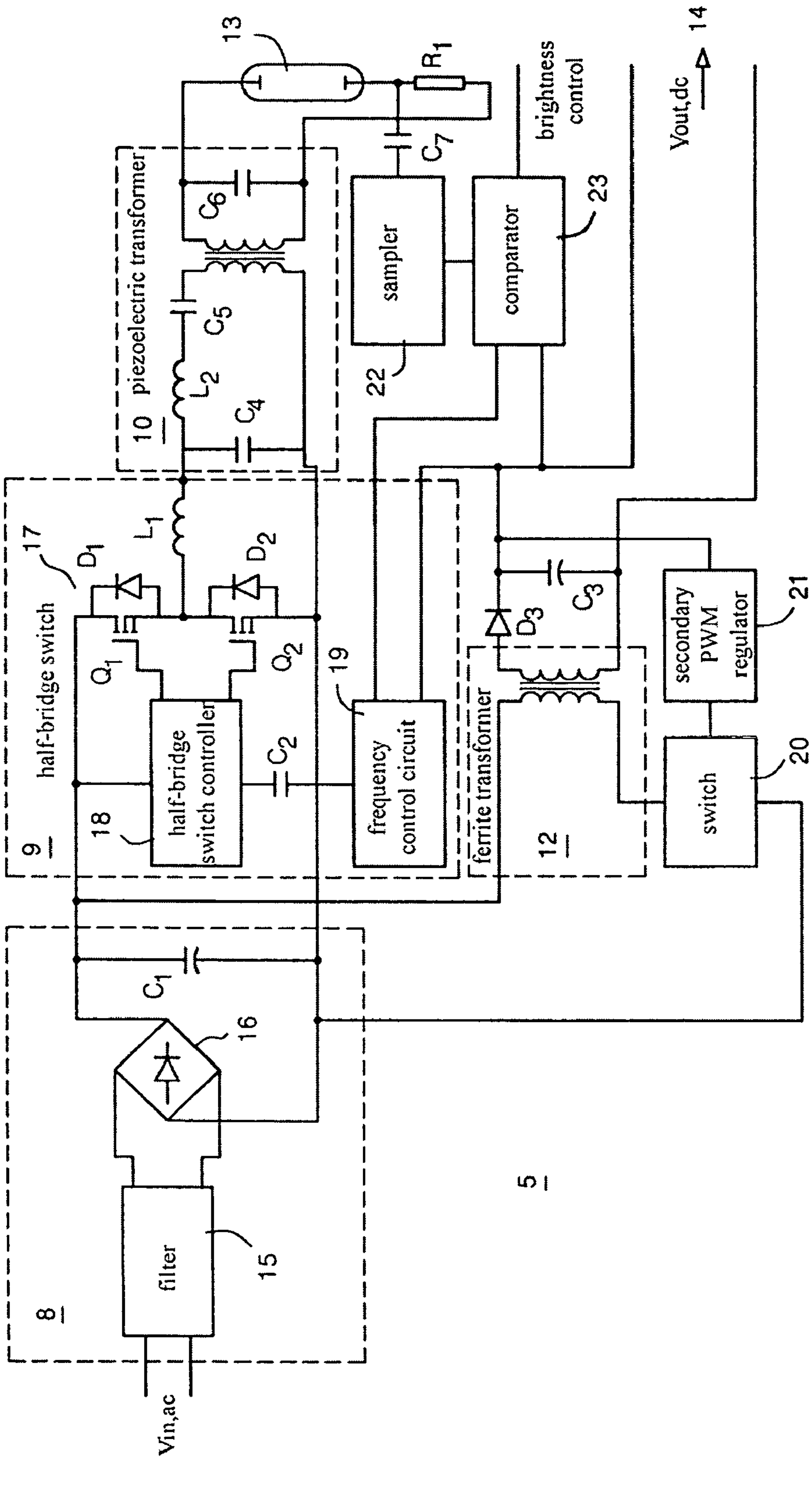
FIG. 6 is a block diagram of a first embodiment of the present invention.

FIG. 6 is a circuit diagram of a first embodiment of the present invention.

In this embodiment, a sampler 22 and a comparator 23 are provided for automatic feedback control of the brightness of the CCFL 13. The sampler 22 generates a sampling voltage from an AC current of a CCFL 13 and the comparator 23 compares the sampling voltage with a predetermined reference voltage and generates a feedback output voltage. In this embodiment, a half-bridge MOSFET switch 17 is used as a frequency-controlled DC-AC converter 9.

First, an input voltage $V_{in}$ is input to a rectifier/filter 8 including a filter 15 and a rectifier 16, through which the input voltage $V_{in}$ is filtered and rectified. When the input voltage $V_{in}$ is 90-132$V_{AC}$, the rectifier/filter 8 outputs a DC voltage of 120-190$V_{DC}$, and, when the input voltage $V_{in}$ is 180-264$V_{AC}$, it outputs a DC voltage of 250-380$V_{DC}$.

The DC-AC converter 9 including the half-bridge MOSFET switch 17 converts the DC voltage output from the rectifier/filter 8 to an AC voltage. Specifically, transistors Q1 and Q2 of the half-bridge MOSFET switch 17 are alternately activated according to a drive frequency from a frequency control circuit 19, thereby converting the input DC voltage to a square-wave AC voltage. Here, the half-bridge MOSFET switch controller 18 is preferably a Zero Voltage Switching (ZVS) mode half-bridge controller (for example, L6369). The drive frequency for switching the transistors $Q_1$ and $Q_2$ is controlled by the frequency control circuit 19, which is preferably a Voltage Controlled Oscillator Phase Locked Loop (VCO PPL) (for example, HEF 4046 chip).

The square-wave AC voltage output from the DC-AC converter 9 is input to an energy-saving inductance $L_1$. The square-wave AC voltage is stepped up to a sine-wave AC voltage through the inductance $L_1$ and a series input portion of a piezoelectric transformer 10. An output terminal of the piezoelectric transformer 10 is connected to an input terminal of the CCFL 13, so that the stepped-up AC voltage output from the piezoelectric transformer 10 is provided as a sine-wave AC voltage for ignition and discharge current control of the CCFL 13.

The piezoelectric transformer 10 is a ring-dot type piezoelectric transformer and is made of a ceramic composition "$Pb(Zr,Ti)O_3$—$Pb(Mn,Sb)O_3$ (PZT-PMS)". The maximum output of the piezoelectric transformer 10 was 35 W with a 15KΩ load, which is an output corresponding to 4 parallel CCFLs 13*m*, and the output capacitance thereof was 105 pF.

The sampler 22, which is connected to the CCFL 13, detects an AC current in the CCFL 13, and produces a sampling voltage from the AC current through a series-connected resistor $R_1$ and outputs the sampling voltage to the comparator 23. The comparator 23 compares the sampling voltage with a predetermined reference voltage $V_{ref}$ to control the brightness of the CCFL 13. Specifically, the comparator 23 includes a general OP amplifier, through which it compares the sampling voltage with the reference voltage to output a DC voltage. The comparator 23 provides the DC voltage to the frequency control circuit 19, thereby performing feedback control of the drive frequency. In another preferred embodiment, the comparator 23 may receive a brightness control signal from the outside and may also receive an electrical signal such as an external sleep mode signal.

Preferably, a standard fly-back switching mode power source having a feedback-based secondary PWM regulator 21 may be used as a secondary power consumption block 7, which includes a switch 20 and a ferrite step-down transformer 12. Preferably, the switch 20 and the ferrite step-down transformer 12 are a TINY 266 switch and an EE20 core ferrite step-down transformer, respectively. A stepped down AC voltage output from the ferrite step-down transformer 12 is converted to a DC voltage through a rectifier circuit $D_3$ and $C_3$ and the DC voltage is provided to the frequency control circuit 19, the comparator 23, and a display control circuit 14.

Embodiment 2

Figure 7:
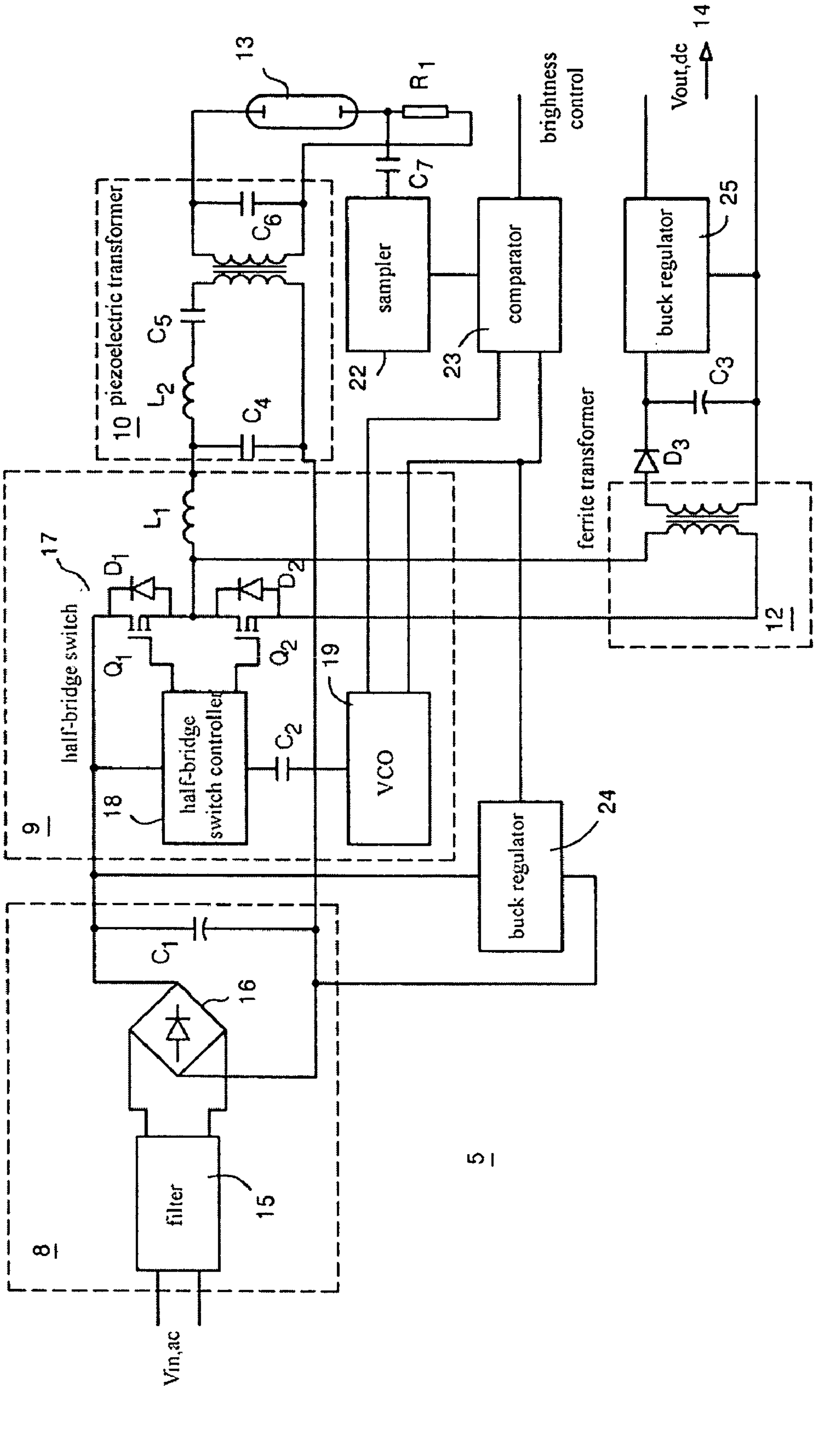
FIG. 7 is a block diagram of a second embodiment of the present invention.

FIG. 7 is a circuit diagram of a second embodiment of the present invention.

In this embodiment, primary terminals of a piezoelectric step-up transformer 10 and a ferrite step-down transformer 12 are connected in parallel to an output terminal of a half-bridge MOSFET switch 17, so that DC-AC conversion is eliminated from a secondary power consumption block 7, thereby increasing the power supply efficiency. Since power consumption of each of a display control circuit 14, a VCO 19, and a comparator 23 is low, buck regulators 24 and 25 are used to reduce and stabilize a DC voltage that is input to these circuits.

An input terminal of the ferrite step-down transformer 12 is connected to an output terminal of the half-bridge MOSFET switch 17. An AC voltage stepped down by the ferrite step-down transformer 12 is converted to a DC voltage through a rectifier circuit $D_3$ and $C_3$. The DC voltage is further stepped down and stabilized through the buck regulator 25, and it is then provided to the display control circuit 14. The rectifier/filter 8 including a filter 15 and a rectifier 16 is connected to another buck regulator 24, through which the DC voltage from the rectifier/filter 8 is stepped down and stabilized to create a secondary power source with low power (for example, 0.25 W), and the stepped down DC voltage is provided to the VCO 19 and the comparator 23. The other elements of this embodiment are similar to those of the first embodiment.

Embodiment 3

Figure 8:
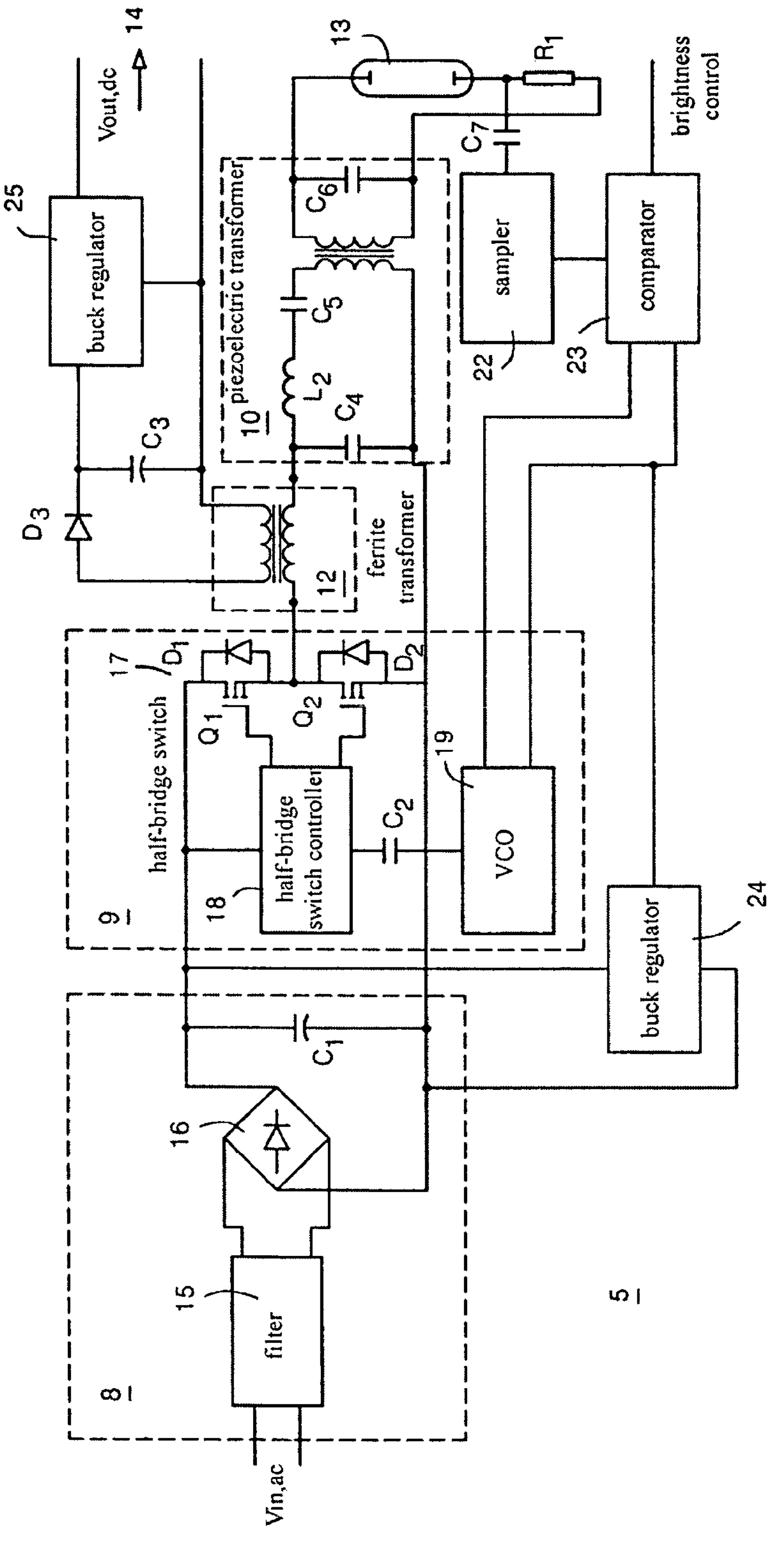
FIG. 8 is a block diagram of a third embodiment of the present invention.

FIG. 8 is a circuit diagram of a third embodiment of the present invention.

In this embodiment, primary terminals of a piezoelectric step-up transformer 10 and a ferrite step-down transformer 12 are connected in series to an output terminal of a half-bridge MOSFET switch 17, so that DC-AC conversion is eliminated from a secondary power consumption block 7, thereby increasing the power supply efficiency. Similar to the second embodiment, since power consumption of each of a display control circuit 14, a VCO 19, and a comparator 23 is low, buck regulators 24 and 25 are used and stabilize a DC voltage that is input to these circuits.

Specifically, an input terminal of the ferrite step-down transformer 12 is connected between an output terminal of the half-bridge MOSFET switch 17 and an input terminal of the piezoelectric step-up transformer 10. Accordingly, this embodiment does not require the energy-saving inductance $L_1$ provided in the first and second embodiments. The other elements of this embodiment are similar to those of the second embodiment.

Although novel and fundamental features of the present invention have been described with reference to the variety of embodiments, the description of the embodiments is only for illustrative purposes to provide an overall understanding of the invention. Those skilled in the art will appreciate that various modifications, additions, and substitutions are possible, without departing from the scope and spirit of the invention as disclosed in the accompanying claims.

INDUSTRIAL APPLICABILITY

In the hybrid power supply system according to the present invention, the efficiency of the primary power consumption block 6 is increased up to about 95% (98% for the DC-AC converter 9 and 97% for the piezoelectric transformer 10) and the efficiency of the secondary power consumption block 7 is 75%, which is the general efficiency of the fly-back converter. When the hybrid power supply system is applied to drive a 17 LCD monitor, power consumption of a CCFL 13 in the LCD monitor is generally 22-25 W and power consumption of a display control circuit 14 therein is generally 5 W. Thus, the overall power efficiency of the hybrid power supply system according to the present invention is 91%, which is about 21% higher than the conventional power supply system.

The frequency-controlled DC-AC converter 9 operates near the resonance frequency, and the piezoelectric step-up transformer 10 is a very low EMI noise source. Accordingly, the hybrid power supply system according to the present invention significantly reduces EMI noise, compared to the conventional power supply system.

Thus, the hybrid power supply system according to the present invention reduces the EMI noise and increases the power efficiency. The hybrid power supply system also integrates the input portion of the piezoelectric transformer 10, the input portion of the ferrite transformer 12, and the output portion of the DC-AC converter circuit 9, thereby increasing the power supply efficiency.

With the reduced EMI noise and the increased power efficiency, the hybrid power supply system according to the present invention can be very efficiently used for CCFLs, which are discharge lamps of a backlight for a general LCD monitor, and display control circuits for the LCD monitor.

The invention claimed is:

1. A hybrid power supply system for driving a discharge lamp, the hybrid power supply system comprising:

a rectifier/filter having an input terminal connected to an external AC voltage, the rectifier/filter converting the external AC voltage to a DC voltage;

a piezoelectric inverter connected to the rectifier/filter, the piezoelectric inverter stepping up and converting the DC voltage to an AC voltage for driving the discharge lamp; and a ferrite converter connected to the rectifier/filter, the ferrite converter stepping down the DC voltage to a rated DC voltage for driving discharge lamp circuits other than the discharge lamp, the piezoelectric inverter including:

two first switching circuits having respective input terminals and a common output terminal;

a driver circuit electrically coupled to respective control input terminals of the first switching circuits, the driver circuit driving the first switching circuits;

at least one piezoelectric step-up transformer having a primary side electrically coupled to the common output terminal of the first switching circuits and a secondary side electrically coupled to the discharge lamp;

a sampling circuit electrically coupled to the discharge lamp, the sampling circuit detecting a current value of the discharge lamp and outputting a feedback signal;

a comparator circuit electrically coupled to the sampling circuit and a frequency control circuit, the comparator circuit comparing the feedback signal with a predetermined reference signal; and the frequency control circuit electrically coupled to the comparator circuit and the driver circuit, the frequency control circuit controlling a switching frequency for the switching circuits according to an output signal of the comparator circuit, the ferrite converter including a ferrite step-down transformer and a rectifier circuit, the ferrite step-down transformer having a primary side electrically coupled to the output terminal of the switching circuits and a secondary side electrically coupled to the rectifier circuit, the rectifier circuit electrically coupled to the secondary side of the ferrite step-down transformer.

2. The hybrid power supply system according to claim 1, wherein the primary side of the ferrite step-down transformer is electrically coupled to the common output terminal of the first switching circuits and the respective input terminals thereof.

3. The hybrid power supply system according to claim 1, wherein the primary side of the ferrite step-down converter is electrically coupled to the common output terminal of the first switching circuits and the primary side of the piezoelectric step-up transformer.

4. The hybrid power supply system according to claim 1, further comprising an additional AC-DC circuit electrically coupled to an input-side AC circuit, the comparator circuit, and the frequency control circuit.

5. The hybrid power supply system according to claim 1, further comprising an additional DC-DC circuit electrically coupled to an input-side AC circuit, the comparator circuit, and the frequency control circuit.

6. The hybrid power supply system according to any one of claims 1-5, wherein the ferrite converter further includes a buck regulator electrically coupled to the rectifier circuit.

7. The hybrid power supply system according to claim 1, wherein the ferrite converter includes:

a second switching circuit electrically coupled to the ferrite step-down transformer, the second switching circuit driving the ferrite step-down transformer; and a secondary regulator circuit electrically coupled to the second switching circuits and the rectifier circuit, the secondary regulator circuit feeding an output voltage of the rectifier circuit back to the second switching circuit.

8. The hybrid power supply system according to claim 1, wherein the comparator circuit is electrically coupled to an external brightness control signal.

9. The hybrid power supply system according to claim 1, wherein the piezoelectric step-up transformer includes a Rosen type piezoelectric transformer, a ring type piezoelectric transformer, or a ring-dot type piezoelectric transformer.

* * * * *